(12) United States Patent
Ehrnberg (10) Patent No.: US 9,631,503 B2
(45) Date of Patent: Apr. 25, 2017

(54) DYNAMIC TURBINE SYSTEM

(75) Inventor: Daniel Ehrnberg, Gothenburg (SE)

(73) Assignee: SEA-TWIRL AB, Gothenburg (SE)

( * ) Notice: Subject to any disclaimer, the term of this patent is extended or adjusted under 35 U.S.C. 154(b) by 672 days.

(21) Appl. No.: 13/978,752

(22) PCT Filed: Jan. 9, 2012

(86) PCT No.: PCT/SE2012/050006
§ 371 (c)(1),
(2), (4) Date: Jul. 9, 2013

(87) PCT Pub. No.: WO2012/096616
PCT Pub. Date: Jul. 19, 2012

(65) Prior Publication Data
US 2013/0287572 A1   Oct. 31, 2013

(30) Foreign Application Priority Data
Jan. 10, 2011   (SE) ...................... 1100015

(51) Int. Cl.
| F03D 3/00 | (2006.01) |
| F01D 7/00 | (2006.01) |
| F03D 3/06 | (2006.01) |
| F03D 7/06 | (2006.01) |
| F03B 3/14 | (2006.01) |
| F03B 17/06 | (2006.01) |

(52) U.S. Cl.
CPC .................. *F01D 7/00* (2013.01); *F03B 3/14* (2013.01); *F03B 17/063* (2013.01); *F03D 3/062* (2013.01); *F03D 3/064* (2013.01); *F03D 7/06* (2013.01); *F05B 2210/16* (2013.01); *F05B 2240/202* (2013.01); *F05B 2240/915* (2013.01); *F05B 2240/93* (2013.01); *Y02E 10/74* (2013.01)

(58) Field of Classification Search
None
See application file for complete search history.

(56) References Cited

U.S. PATENT DOCUMENTS

| 4,401,284 A * | 8/1983 | Austin ..................... B63H 9/02 |
| | | 114/39.3 |
| 4,624,624 A | 11/1986 | Yum |
| 4,775,340 A | 10/1988 | Sundman |
| 5,531,567 A | 7/1996 | Hulls |
| 7,241,105 B1 * | 7/2007 | Vanderhye ............ B63H 13/00 |
| | | 415/4.2 |

(Continued)

FOREIGN PATENT DOCUMENTS

| DE | 3137966 | 3/1983 |
| GB | 2404227 | 1/2005 |
| WO | 2011/008153 | 1/2011 |

OTHER PUBLICATIONS

International Search Report dated Apr. 18, 2012, corresponding to PCT/SE2012/050006.

(Continued)

*Primary Examiner* — Dwayne J White
*Assistant Examiner* — Justin Seabe
(74) *Attorney, Agent, or Firm* — Babcock IP, PLLC (57) ABSTRACT

Disclosed is a dynamic turbine, capable of altering the sweep area in a large interval by moving a first fixing structure, a second fixing structure and blades to and from an essential same plane along an axis of rotation of the turbine.

8 Claims, 5 Drawing Sheets

(56) References Cited

U.S. PATENT DOCUMENTS

2008/0187432 A1    8/2008   Cowan
2011/0081243 A1*   4/2011   Sullivan ................. F03D 3/002
                                                                                                416/120

OTHER PUBLICATIONS

Thomas Altmann, Supplementary European Search Report, counterpart EPO application No. EP12734002, Sep. 6, 2016, European Patent Office, The Hague, NL.

* cited by examiner

DYNAMIC TURBINE SYSTEM

TECHNICAL FIELD

The present invention relates to a dynamic turbine system, capable of altering the sweep area in a large interval.

BACKGROUND ART

Motions in air and water are a concentrated form of renewable energy resources that hold great opportunities to provide energy in an environmentally friendly way. And humans have used these resources for thousands of years. The energy has partly been absorbed and converted by vertical axis power plants, meaning that the part of the power plant that absorbs the energy is located on an axis that is vertically directed, and partly by horizontal axis power plants, meaning that the part of the power plant that absorbs the energy is located on an axis that is horizontally directed. The power output of a turbine is directly related to the sweep area of its turbine. And the sweep area is roughly the area that the turbine is capable of extracting the energy from.

However it could in many different situations be an advantage to alter the sweep area of a turbine. For example one could lover the friction losses from a spinning flywheel storing energy in form of rotation or in extreme weather where you would like to absorb less energy.

A previous power plant that has solved some interval of these problems is the patent application US20080187432, which comprises a vertical axis wind turbine having a plurality of blades spaced from a rotatable around a rotor shaft vertical to the ground. U.S. Pat. No. 4,775,340 discloses a similar example of this wherein a turbine apparatus for providing support peripherally for a turbine rotor having either a vertical or horizontal axis of rotation.

Even though the above described arrangements may alter the sweep area is there still a desire for a dynamic turbine which is constructed to be able to efficiently change its configuration.

SUMMARY OF THE INVENTION

The present invention relates to a dynamic turbine for a wind power plant capable of changing its sweep area. The dynamic turbine defines an axis around which it is intended to rotate. The dynamic turbine comprises at least two blades having a first end and a second end in its longitudinal extension. The number of blades may be a rather large number, in particular if the turbine is of large dimensions. The blades are preferably evenly distributed in the turbine. The turbine further comprises a first fixing structure which serves as a first support structure for the at least two blades and the first fixing structure is designed to rotate with the attached blades around said axis. The blades are pivotally attached with respect to said first fixing structure at for each blade respective first attachments. The turbine also comprises a second fixing structure which also is designed to rotate around said axis in the same way as the first fixing structure. The second fixing structure serves as a second support structure for said at least 2 blades which are pivotally attached with respect to said second fixing structure at for each blade respective second attachments. These second attachments are located closer to the second longitudinal end of the blades than the first attachments. The blades may be attached at, or close to, its respective first and second ends to the first and second support structures. The dynamic turbine may have a shape of two rings spaced apart from each other representing the two support structures which are connected by a desired number of blades. Each of the ring shaped support structures may be provided with a desired number of spokes connecting the ring shaped part of the support structure with a central axle such that the turbine will rotate with the axle. The turbine is further designed such that it may change between a first and second turbine mode. In the first turbine mode is the first fixing structure spaced apart from said second fixing structure by a maximum distance D in an axial direction, i.e. in the direction along the axis around which the turbine rotates. In the second turbine mode is the first fixing structure spaced apart from said second fixing structure by a distance which is less than the distance D in the axial direction. The change between these modes, i.e. the changing of the distance between the fixing structures, is performed while said at least two blades pivot relative said first and second fixing structures around their respective first and second attachments while said first fixing structure and said second fixing structure are moving relative each other in the axial direction along said axle. There is thus a folding action of the turbine when the fixing structures are moving closer to each other. The folding may occur while the blades keep essentially the same distance relative said central axis of rotation. Hence, the blades may in this case perform a pivotal motion around an axis which is parallel to a radial direction of the turbine, i.e. the blades may perform a pivotal motion around an axis essentially parallel to a spoke of the fixing structures.

The turbine may have a shape reminding of a cylinder wherein the support structures form ring shaped end structures and the blades are connected between the end structures and while rotating covering or defining the surface area of the cylinder. The blades may be shaped to be curved outwards and the actual shape of the surface of the rotating turbine will in this case remind of a barrel or even a truncated sphere.

The dimensions of the turbine may vary within a wide variety and the length of the blades may be from a couple of meters up to 100 meters or more. The diameter of the turbine may also be very different and may vary within essentially the same range. The distance between the centre axis and the attachment points is in general at least D/5 wherein D is the maximum distance between the first and second support structure. In general, the blades are attached at the first and second support structure at a distance of at least 10 metres from the central axis for a large scale production unit. For large scale energy production the dimensions of a turbine having a cylinder or barrel shaped design may be a diameter of around 40 metres of the ring shaped support structures and a maximum height of around 30 metres when the turbine is in its second mode. The turbine may of course be attached to any kind of support column comprising an axle but this turbine is particularly suitable for a wind power plant to be located at sea. A turbine having the above described dimensions may suitably be attached to an elongated support structure, e.g. a column or pillar, having a length of around 100 meters which is designed such that a little bit more than 50 per cent of its length is below the sea surface and a little bit less than half the column length is above the sea surface. The dimensions of the turbine may of course change and the turbine may have a diameter of 250 metres and a height of 180 metres being attached to a column of around 400 metres or a little bit more. However, the specific dimensions of the turbine are not essential for the invention to work but are rather described to give an idea of working embodiments of the invention. However, even though the dimensions not are essential for the invention to work, the turbine needs to be adapted to the dimensions, e.g. the shape and number of blades may be adapted to the dimensions of the turbine support structure such that the blades may fit to provide a desired shape when folded.

The blades may be attached to the support structures in different ways. According to one embodiment are the blades attached at its first and second attachments to fixed points of the first and second fixing structures. In this case will the first fixing structure perform a rotational movement around said axle relative said second fixing structure while the distance D between the first fixing structure and second fixing structure is changed. This may be performed by providing the axle with some kind of rail or the like arrangement which controls the rotational movement of the support structure while changing the distance between the support structures. However, this is not necessary but the rotation may also only be performed as a consequence of the folding action while the relative distance of the support structures is changed and the rotation is induced by the pivoting of the blades around their fixed pivot points.

In an alternative embodiment may the folding of the turbine be performed without any rotational movement of the support structures. This is possible, for example, if the support structures for the first and/or second attachments for a blade comprises a rail. The blade may then perform a translational movement in the rail while also rotating relative said first and/or second fixing structure when the distance D between the first fixing structure and second fixing structure is changed. It will thus be possible if at least one of the attachments of said first and/or second attachments for all blades comprises a rail to change the distance between the support structures without any relative rotation between the first and second fixing structure. In this case will the blades perform a translational movement and rotation relative said first and/or second fixing structure while the distance D between the first fixing structure and second fixing structure is changed. The other attachment may in this case be a fixed, pivotal point.

A change between the first and second turbine mode may involve a change of the distance D between the first and second fixing structure corresponding to at least a factor 3, i.e. the distance D between the top and bottom fixing structures in the first turbine mode is three times longer than in the second turbine mode. It may be desired to be able to fold the turbine completely, i.e. the first and second fixing structure may be located in the same plane or adjacent to each other when the turbine is in its second turbine mode. The blades may be designed to essentially follow a part of said first and/or second fixing structure when said turbine is in its second turbine mode. In case the support structure is circular shaped may the blades have a corresponding curvature such that they will fit and follow the support structures when folded.

The first fixing structure and second fixing structure may have a shape and size such that they may be fitted on or in each other when said turbine is in its second turbine mode and folded to be in essentially the same plane.

The blades may be designed to follow the shape of said first and/or second fixing structure when said turbine is in its second turbine mode. The turbine may be designed to have said blades interposed radially between said top and bottom fixing structures in the second turbine mode when the first and second fixing structures are located at essentially the same level The first and second fixing structure may have different shapes but they are generally thought to be circular shaped provided with spokes for attachment to an axle. However, other shapes are of course also possible. In an embodiment are the fixing structures circular shaped and the blades are shaped as circle segments having a curvature corresponding to a radius being of the same magnitude as the radius of the first and/or second fixing structure. If the sizes of the fixing structures are different may the curvature of the blades be the same as any of these fixing structures or in between these two curvatures.

The turbine is intended to form part of wind power plant. In addition to be used as a wind power plant, it may also be used as an energy storage device, e.g. as described in WO2011008153. The power plant may advantageously be used as an energy storage device when it is in its folded mode. In order to work efficiently as an energy storage device, it is beneficial if the turbine may rotate with low friction losses or loose energy in any way. The turbine may thus be designed such that it has a stream lined shape when it is folded and the support structures may be designed to cooperate to form a stream lined shell which is adapted to comprise the blades within this structure.

A wind power plant comprising the turbine may be used as an offshore plant. The plant may in this case be designed such that it is floating and attached by wires to the bottom in such a way that the wires pull the plant downwards, i.e. the plant strives to float up further when attached. The plant may also be designed such that the parts which may be a probable object for maintenance, e.g. a generator, could be located above the water line and easy to access. Likewise, a motor or the like device for raising and folding the turbine could be located close to the water line to be easy to access.

If the plant is located offshore, it is an advantage that the water may be used as a bearing and rather large power plants may be possible without the need for gigantic bearings. If the plant is to be located on land, it could be located in a pool or the like. However, it is obvious the turbine also could be used for power plant having a pole or pillar fixed to the ground.

The present dynamic turbine thus comprises at least two blades but will in many cases comprise a plurality of blades spaced from and rotatable around a rotational axis. The blades are distributed around the rotational axis and are preferably spaced apart equidistantly in order to avoid skewing of the turbine while rotating. The blades have a longitudinal extension having a first longitudinal end and a second longitudinal end and having longitudinally stretching edges forming a leading edge facing the wind and a trailing edge. As previously described are the blades pivotally fixed to a first and second fixing structure such that a flexible turbine structure may be achieved. The dynamic turbine system may thus be designed such that it is capable of moving said top first and second fixing structures relatively each other while said blades also perform a rotational, and optionally also a translational motion, relatively said fixing structures such that the blades and fixing structures are located close to each other in the axial direction, e.g. the blades and fixing structures may be located essentially in the same plane and having an extension in the axial direction which is less than 10 percent of the maximum distance D of the turbine in its maximum raised first mode By adapting the geometry of the fixing structures and blades may these thus be moved to and from an essential same plane. The geometry needs to be according to each of these parts. For an example; if the fixing structures are round rings then the blade geometry also can be shaped curved to be able to arrange the blades in between or along the fixing structures. The first and second fixing structures may have somewhat different dimensions such that the first and/or second fixing structure at least partly may fit in and overlap each other in the axial direction while the blades are located between these fixing structures. These dynamic turbines may be used in combination with flywheels and the turbine could be folded when not needed or when the friction should be minimized. It could also be used to lower the mass centre and/or to reduce the sweep area, i.e. the area which is able to capture wind power, in order to withstand a storm better. In this way, turbines can be less exposed to fluid movement. By designing the blades and the fixing structures, or support structures, appropriately, the dynamic turbine sweep area could be altered in an efficient way by moving the fixing structure to and from each other. This movement is thus possible to make with a rather uncomplicated system if the overall dimensions and structures are designed as described herein. Additionally, by designing the fixing structures to cooperate with each other when the turbine is in its folded state, may the folded turbine be streamlined which can minimize the friction and for example be used as a flywheel which continues to spin even if the wind has stopped.

The dynamic turbine could be used as a vertical axis turbine. In this case will there thus be a first, top fixing structure and a second, bottom fixing structure whereof one or both of these fixing structures may be moved in order to fold or raise the turbine and change its sweep area. One could limit the number of moving parts if only one of the top or bottom fixing structures is being moved. The fixing structures may be moved relative each other such that said top fixing structure, said bottom fixing structure and blades are moved to a position where they are in an essential same plane. This could for example be used as a protective mode in extreme weather.

The dynamic turbine system has been exemplified to be used for a vertical axis wind turbine system which is considered to be the main use of the present invention. A vertical axis wind turbine could use a dynamic turbine system to handle the variations of the wind energy resource better.

BRIEF DESCRIPTION OF THE ACCOMPANYING DRAWINGS

The present invention will be explained below by means of non-limiting examples with reference to the accompanying drawings, in which.

DETAILED DESCRIPTION OF THE PREFERRED EMBODIMENTS

The invention will be described by means of examples of embodiments. It should nevertheless be understood that these embodiments only serve as to elucidate the present invention, the extent of protection of which is limited by the following claims.

It is for example obvious that the top fixing structure and bottom fixing structure may be of different sizes such that the fixing structures may overlap each other. It is also obvious that other shapes than round may be possible for the fixing structure, e.g. the support structures may be hexagonal with six straight blades attached at the corners such that the blades will follow the sides of the hexagon when the turbine is folded and the support structures are located at the same level or close to each other.

Figure 1:
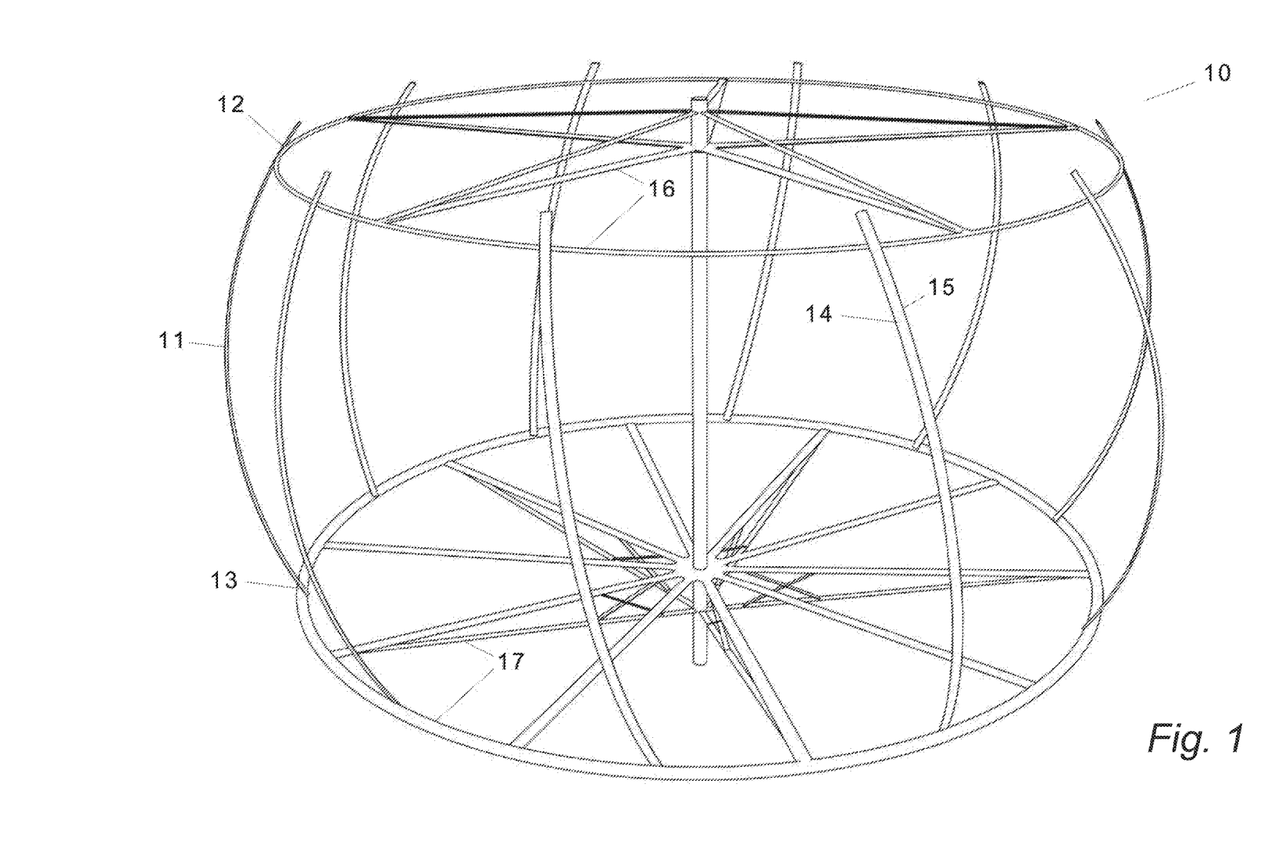
FIG. 1 shows a schematic, perspective view of an embodiment of the dynamic turbine system which has a large sweep area.

FIG. 1 schematically shows the dynamic turbine system 10 comprising a plurality of blades 11 spaced from and rotatable around a rotational axis; said plurality of blades 11 distributed around the said rotational axis; each said blade 11 having a top 12, a bottom 13, a leading edge 14, and a trailing edge 15; said plurality of blades top 12 flexibly fixed to a first, top fixing structure 16 and bottom 13 flexible fixed to a second, bottom fixing structure 17, wherein FIG. 1 to FIG. 5 shows an example of said method to move said bottom fixing structure 17, said top fixing structure 16 and blades 11 to and from an essential same plane. The dynamic turbine system and method could be used to alter the sweep area in some cases just a small change as between FIG. 1 and FIG. 2 but in some examples all the way down to FIG. 5.

Figure 2:
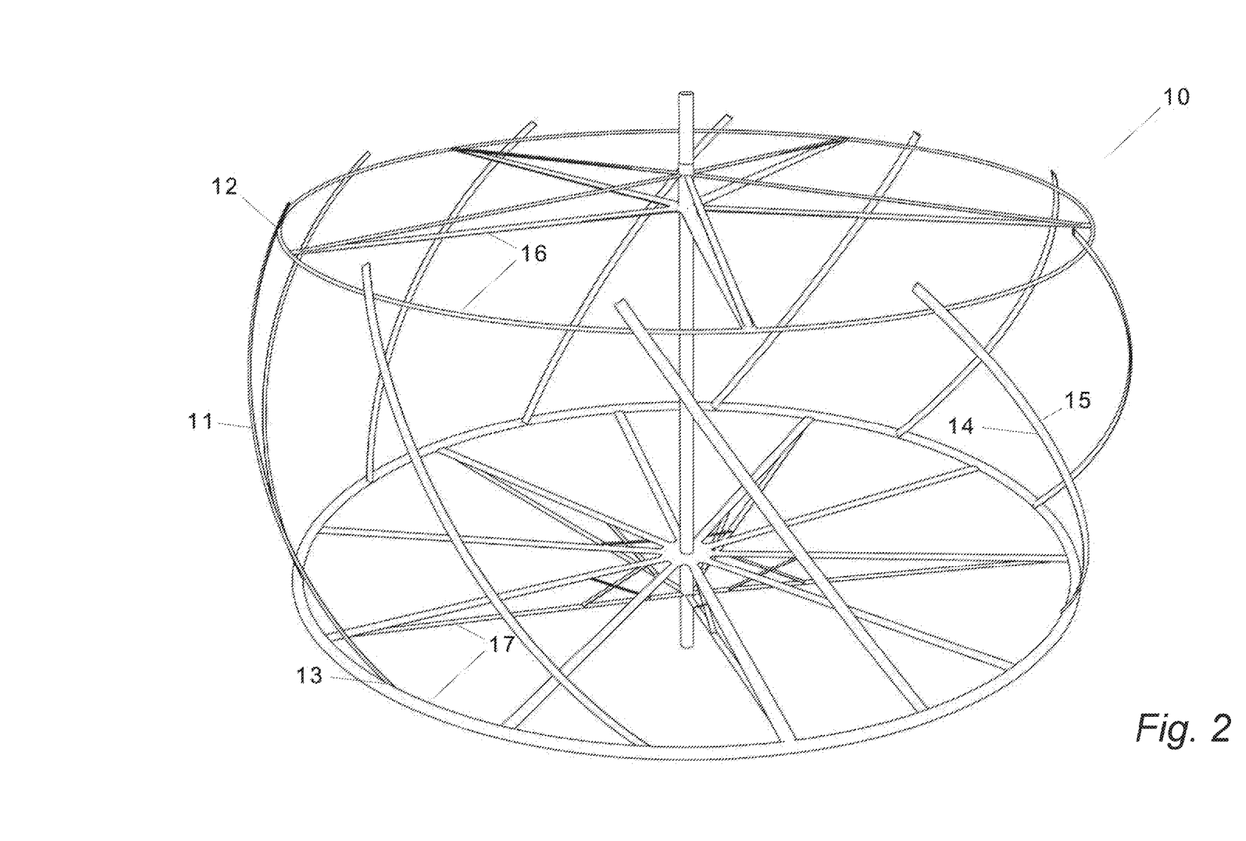
FIG. 2 shows a schematic, perspective view of an embodiment of the dynamic turbine system which has a less sweep area than FIG. 1.

FIG. 2 schematically shows said dynamic turbine system 10 that in this case is a vertical axis turbine and where an example of the method further involves to move just one of the top fixing structure 16 or bottom fixing structure 17 and said blades 11. In this example it is the top fixing structure 16 that is being moved down in a spiral movement. In this example it can be good if the tower connecting top fixing structure 16 and bottom fixing structure 17 is used by the top fixing structure 16 to slide down from. Said tower could in this case hold the spiral pattern to always secure that the top fixing structure 16 has the correct position movement and height during the slide down or when moved upwards.

Figure 5:
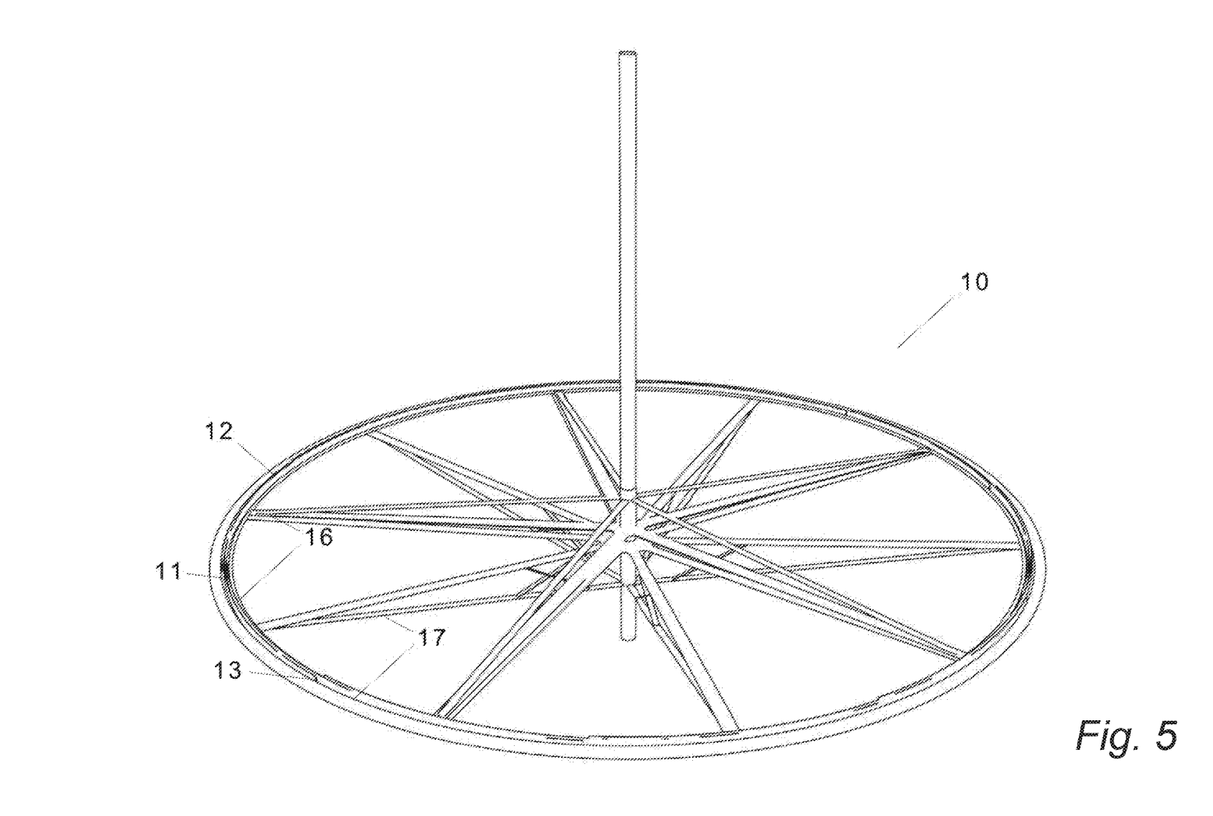
FIG. 5 shows a schematic, perspective view of an embodiment of the dynamic turbine system which has a less sweep area than FIG. 4.

FIG. 5 schematically shows said dynamic turbine system 10 and an example of said method where said top fixing structure 16, said bottom fixing structure 17 and blades 11 can be moved to a position where they are in an essential same plane.

Figure 3:
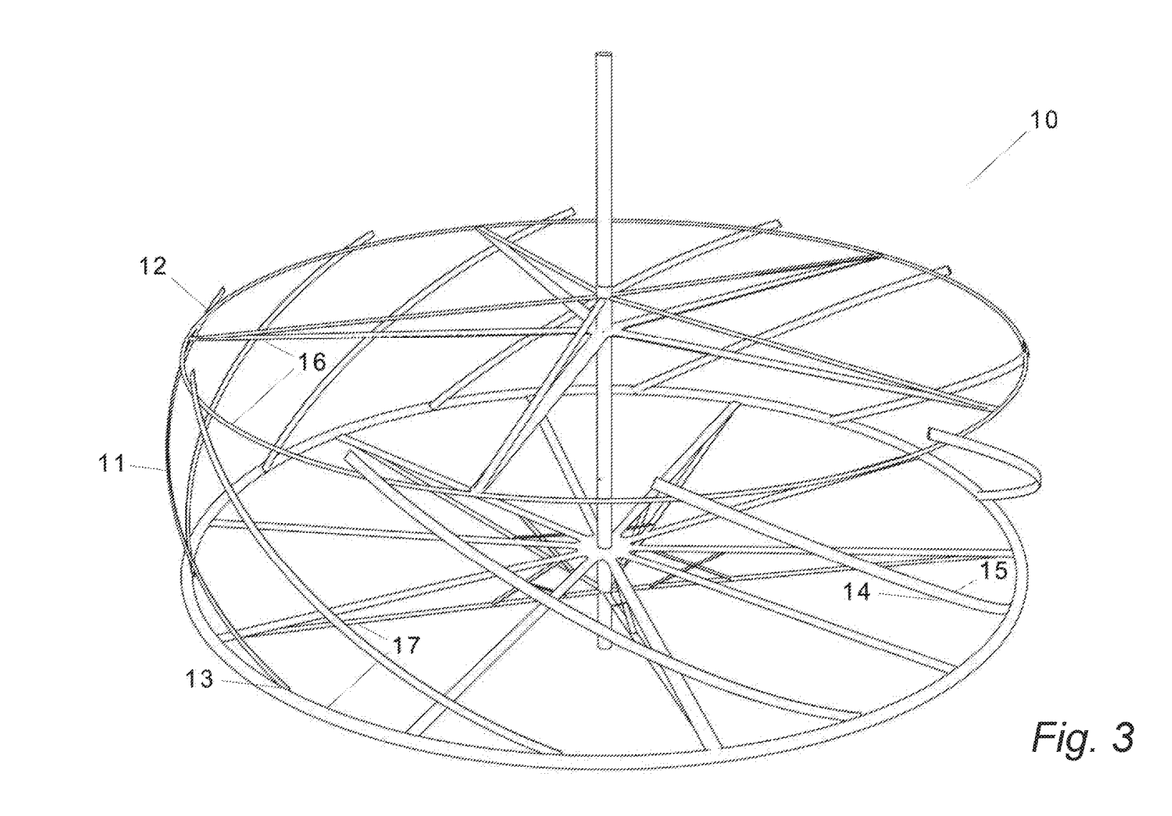
FIG. 3 shows a schematic, perspective view of an embodiment of the dynamic turbine system which has a less sweep area than FIG. 2.

FIG. 3 schematically shows said dynamic turbine system 10 comprising a plurality of blades 11 spaced from and rotatable around a rotational axis; said plurality of blades 11 distributed around the said rotational axis; each said blade 11 having a top 12, a bottom 13, a leading edge 14, and a trailing edge 15, said plurality of blades top 12 flexibly fixed to an top fixing structure 16 and bottom 13 flexible fixed to an bottom fixing structure 17, where said blade 11 holds a geometry that makes it possible to arrange the blades 11 in between or along said bottom fixing structure 16 and top fixing structure 17 as in FIG. 5. FIG. 3 shows an example of the method where the sweep area has been made smaller to handle strong winds.

Figure 4:
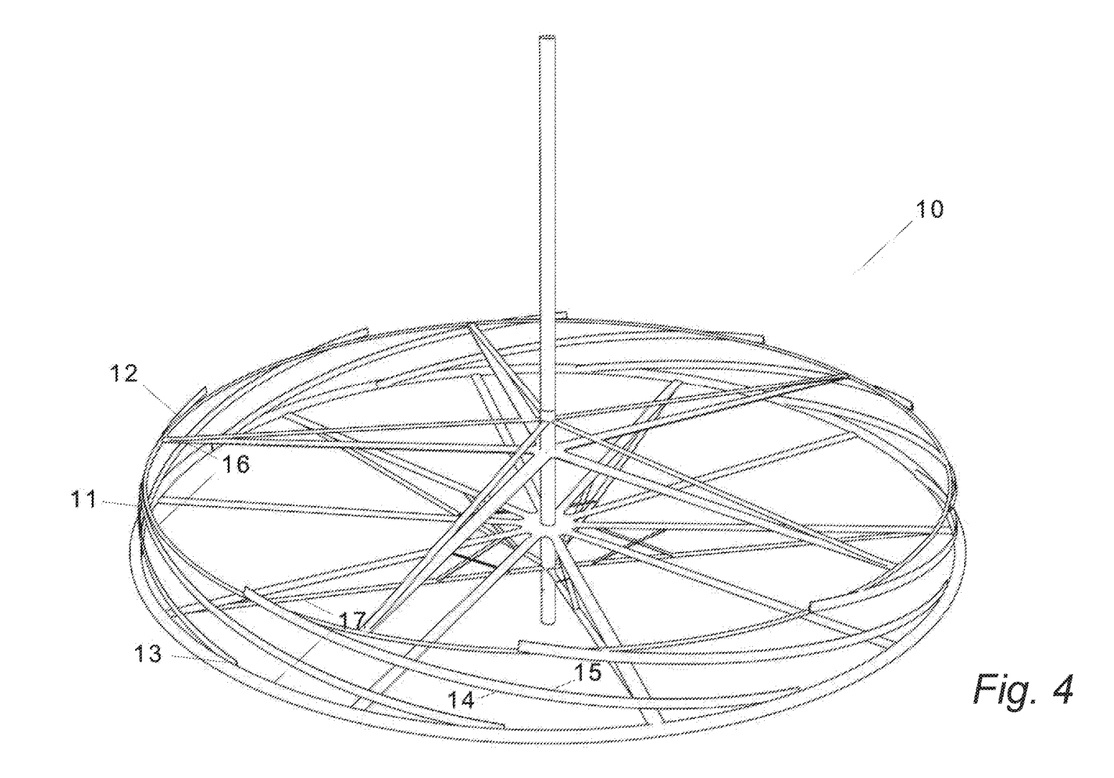
FIG. 4 shows a schematic, perspective view of an embodiment of the dynamic turbine system which has a less sweep area than FIG. 3.

FIG. 4 schematically shows an example of said dynamic turbine system 10, where said dynamic turbine system 10 is a vertical axis turbine. One such vertical axis turbine could for example be used as a vertical axis wind turbine system to absorb wind energy.

FIGS. 1 to 5 schematically shows an example of said dynamic turbine system 10, where the geometry of said blades 11 makes it possible to arrange the blades in between said top fixing structure 16 and bottom fixing structure 17 as seen in FIG. 5. It should however be noted that other shapes is possible of the blades and said bottom fixing structure 16 and top fixing structure 17. For example one could have a dynamic turbine system 10 with six straight blades 11 and a top fixing structure 16 and bottom fixing structure 17 in hexagon like shapes instead of circular. This could be changed in a number of different ways with different amounts of blades and shapes.

Alternative Embodiments

It should also be mentioned that in further different embodiments it may be handy to equip the dynamic turbine system 10 with other types of power turbines. One example of this could be to help during the start of rotation. The turbine could also be started with external energy as electric energy.

One example of how said dynamic turbine system 10 could be used could be illustrated during a day where the dynamic turbine system 10 is mounted on an offshore floating flywheel to absorb wind energy. At the morning the wind is weak and the dynamic turbine system 10 is maximised to have as large sweep area as possible. At mid day there is a storm and the sweep area is lowered to not break down and to not absorb too much energy from the wind. At the later parts of the day the wind is good and strong. The dynamic turbine system 10 sweep area is now maximised again to absorb as much energy as possible. The energy is stored by the floating flywheel and when the wind stops blowing the flywheel would like to continue to rotate without too much friction loss to the air. The dynamic turbine system 10 is then used and lowered to minimize the friction loss to the air and to enable the continuance rotation of the flywheel.

It should be noted that the present invention is in no way limited to the above mentioned embodiments, but can be varied freely within the scope of the following claims. For example, the dynamic turbine system 10 could be equipped with fins, blade tips, floating pontoons, weights or similar means to, for example, to influence the movement qualities of the dynamic turbine system 10. The dynamic turbine system 10 could also just be used to vary the sweep area slightly and may not use the full interval showed in FIG. 1 and FIG. 5. The dynamic turbine system 10 could for example vary only five percent interval of the total sweep area. And the dynamic turbine system 10 may for example never be used in the lowest position as showed in FIG. 5 where said bottom fixing structure 16, said top fixing structure 17 and blades 11 is in an essential same plane. It should also be noted that said blades 11 is flexibly fixed to an top fixing structure 16 and bottom fixing structure 17, where the flexibility allows the blades 11 and the dynamic turbine system 10 to change its sweep area but could for example withstand the change of attack angle of the blades 11.

It should also be mentioned that the dynamic turbine system 10, which absorbs energy, could absorb this energy from different types of fluids. One example could be air and another example could be water. And also be oriented in a number of ways. One example could be with a vertical axis of rotation and one way could be a horizontal axis of rotation.

It should also be noted that the blade geometry experienced by the fluid for example could be changed when the blade 11 is tilted from a straight upward position and that this could be used for changing the energy extraction efficiency or optimal velocity of the turbine for example.

The invention claimed is:

1. A dynamic turbine for a wind power plant, said dynamic turbine defining a rotational axis around which it is intended to rotate, said dynamic turbine comprising:

a turbine axle;

a first fixing structure attached to said turbine axle and movable along said rotational axis;

a second fixing structure attached to said turbine axle;

an elongated first blade pivotally attached to said first fixing structure at a first attachment location along said first blade to pivot around a first pivot axis intersecting said rotational axis when said first fixing structure moves along said rotational axis, and pivotally attached to said second fixing structure at a second attachment location along said first blade to pivot around a second pivot axis intersecting said rotational axis when said first fixing structure moves along said rotational axis; and an elongated second blade pivotally attached to said first fixing structure at a third attachment location along said second blade to pivot around a third pivot axis intersecting said rotational axis when said first fixing structure moves along said rotational axis, and pivotally attached to said second fixing structure at a fourth attachment location along said second blade to pivot around a fourth pivot axis intersecting said rotational axis when said first fixing structure moves along said rotational axis.

2. The dynamic turbine according to claim 1 wherein each of said first blade and said second blade is attached to said first fixing structure and said second fixing structure such that said first fixing structure performs a rotational movement around said rotational axis relative to said second fixing structure when said first fixing structure moves along said rotational axis.

3. The dynamic turbine according to claim 1, wherein said dynamic turbine is controllable between:

a first turbine mode in which said first fixing structure is spaced apart from said second fixing structure by a maximum distance in an axial direction; and a second turbine mode in which said first fixing structure is spaced apart from said second fixing structure by a distance which is less than said maximum distance in the axial direction.

4. The dynamic turbine according to claim 3 wherein said first fixing structure and said second fixing structure are located in the same plane when said dynamic turbine is in said second turbine mode.

5. The dynamic turbine according to claim 1, wherein at least one of said first fixing structure and said second fixing structure is circular.

6. The dynamic turbine according to claim 3 wherein a transition of said dynamic turbine from said first turbine mode to said second turbine mode results in a change of a distance between said first fixing structure and said second fixing structure from said maximum distance to one third of said maximum distance or less.

7. The dynamic turbine according to claim 3, wherein, when said dynamic turbine is controlled from said first turbine mode to said second turbine mode:

said first blade maintains a first distance to said rotational axis; and said second blade maintains a second distance to said rotational axis.

8. The dynamic turbine according to claim 1, wherein each of said first blade and said second blade is curved.

* * * * *